(12) United States Patent
Lu

(10) Patent No.: US 11,765,088 B2
(45) Date of Patent: Sep. 19, 2023

(54) METHOD AND SYSTEM FOR PROCESSING DATA FLOW WITH INCOMPLETE COMPARISON PROCESS

(71) Applicant: REALTEK SEMICONDUCTOR CORP., Hsinchu (TW)

(72) Inventor: Kuo-Cheng Lu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 3 days.

(21) Appl. No.: 17/573,187

(22) Filed: Jan. 11, 2022

(65) Prior Publication Data

US 2023/0006930 A1    Jan. 5, 2023

(30) Foreign Application Priority Data

Jul. 2, 2021   (TW) .................................. 110124339

(51) Int. Cl.
*H04L 45/7453* (2022.01)
*H04L 47/2475* (2022.01)
*H04L 47/20* (2022.01)

(52) U.S. Cl.
CPC .......... *H04L 45/7453* (2013.01); *H04L 47/20* (2013.01); *H04L 47/2475* (2013.01)

(58) Field of Classification Search
CPC .. H04L 45/7453; H04L 47/20; H04L 47/2475
See application file for complete search history.

(56) References Cited

U.S. PATENT DOCUMENTS

| 2007/0115982 | A1* | 5/2007 | Pope | G06F 16/9535 |
| | | | | 370/392 |
| 2011/0219010 | A1* | 9/2011 | Lim | H04L 45/745 |
| | | | | 707/E17.014 |
| 2014/0122634 | A1* | 5/2014 | Conner | H04L 47/33 |
| | | | | 709/212 |
| 2017/0302577 | A1* | 10/2017 | Worth | H04L 45/7453 |
| 2020/0053025 | A1* | 2/2020 | Evans | H04L 49/254 |

* cited by examiner

*Primary Examiner* — Jung H Park
(74) *Attorney, Agent, or Firm* — Li & Cai Intellectual Property (USA) Office

(57) ABSTRACT

A method and a system for processing a data flow with an incomplete comparison process are provided. The method is implemented by a network device that includes a flow table and a flow filter in a memory thereof. A flow analyzing module is provided for analyzing and classifying packets of an input flow, and identifying an application category to which the input flow belongs. The flow table is queried according to a result of resolving the input flow for determining whether the input flow matches any flow entry of the flow table. The flow filter is queried if the input flow fails to match any flow entry of the flow table for determining whether features of the input flow match conditions of the flow filter. The input flow is processed accordingly, without needing to copy all flows that do not match the flow entries to the flow table.

16 Claims, 9 Drawing Sheets

METHOD AND SYSTEM FOR PROCESSING DATA FLOW WITH INCOMPLETE COMPARISON PROCESS

CROSS-REFERENCE TO RELATED PATENT APPLICATION

This application claims the benefit of priority to Taiwan Patent Application No. 110124339, filed on Jul. 2, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technique for processing a data flow, and more particularly to a method and a system for processing a data flow with an incomplete comparison process, so as to reduce a processing load.

BACKGROUND OF THE DISCLOSURE

In the pursuit of differentiation in network equipment, demands for identifying network traffic types, improving quality of service (QoS), and/or improving network security have become increasingly important in recent years. For example, if a network switch can identify the difference of video conference traffic and file transfer traffic, the quality of service can be adapted accordingly. That is, the traffic of video conferencing can be prioritized, so as to improve a user experience. In one further example, if the network switch can identify behavior of malicious application traffic, e.g., a Trojan program, information-security vulnerabilities can be fixed at an earliest opportunity.

The capability of identifying network traffic types has always been a major issue. Conventionally, a network operator is able to set up priorities of ports with respect to various network protocols. For example, the ports with respect to a transmission control protocol (TCP) or a user datagram protocol (UDP) can be assigned with a high priority or a low priority. However, these requirements can result in user inconvenience and a user threshold. Furthermore, since more and more applications use dynamic TCP or UDP port numbers, more and more applications are performed behind the known TCP or UDP port numbers, or are transmitted under encryption, identification of network traffic can be difficult to achieve.

To solve the above problems, a conventional method for identifying the network traffic based on flow features has been developed. Said method can identify a flow type according to headers of first few (N) packets of each data flow and statistical features. The statistical features are, for example, a length of every one-way or two-way packet, a length average of the packet, a packet spacing, a variance of packet length, a spacing average between packets, and a variance of packet spacing. Thus, based on the above-mentioned features of the first few packets of each data flow, the conventional technology classifies the flow types through machine learning or deep learning technology.

To achieve the purpose of inspecting the first few packets of each data flow, reference can be made to FIG. 1, which is a schematic diagram showing the data flow being processed in the network switch. The network switch receives an input flow 10 and resolves the input flow 10 by a processor, so as to form a forwarding table 12. The present example shows a port (port=Y) specified to a media access control (MAC) destination in the forwarding table 12. The network switch has a flow table used to record each data flow that passes the network switch. As shown in the diagram, a 5-tuple 14 denotes a header of a data flow. This 5-tuple is configured to include DIP, SIP, SP, DP and Prot that stand for a destination IP, a source IP, a source Layer 4 port, a destination Layer 4 port and a protocol, respectively. The 5-tuple 14 in this exemplary example records the headers of two data flows at different states.

In the network switch, the flow table (such as the 5-tuple 14) is queried when network packets are received. If a flow entry corresponding to the data flow is not found in the flow table (meaning that the data flow is a new data flow), the flow entry of this data flow is then copied to a flow analyzing module 18 via a flow direction 101. The flow analyzing module 18 is a software module that is able to analyze and classify the network packets, so as to identify which application category the data flow belongs to. When the flow analyzing module 18 receives the first few packets of the data flow, an algorithm of flow identification is performed. After identification, the data flow can then be inserted to the flow table of the network switch via a flow direction 103, and a classification result is labeled into the flow entry. After that, when the packets of this data flow enter the network switch again, the data flow can be found in the flow table, and the data flow needs not to be processed by the flow analyzing module 18. The data flow is then forwarded as an output flow 16 according to a destination record in the flow table.

However, according to the above technology, each data flow entering the network switch needs to be processed, and all the data flows are required to be recorded in the flow table. Any new data flow also needs to be copied to the flow analyzing module 18, and then inserted to the flow table. The drawback of the conventional technology is that a processing circuitry (such as an application-specific integrated circuit (ASIC)) of the network switch requires an adequate space to store a large amount of data flow records, which is generally around 100K entries. The space is relatively large as compared to the data flows that are of concern to a user. Further, the packets of the new data flow will be copied to the flow analyzing module 18, and additional processing is required. Still further, even if the flow analyzing module 18 only requires the first few packets of the data flow, due to a processing time difference, the data flow that is classified may not be returned to the flow table in time, and an extra processing load can occur in the flow analyzing module 18 when the packets required to be processed in the flow analyzing module 18 exceeds an amount originally required to be processed.

SUMMARY OF THE DISCLOSURE

In response to the above-referenced technical inadequacies (such as a processing circuit of a network switch requiring a large amount of memory space to store data flow records and an extra processing load is generated when the processing circuit processes incoming packets), the present disclosure provides a method and a system for processing a data flow with an incomplete comparison process. In the method, by use of a packet filtering mechanism and an incomplete comparison table, the memory space required for storing a flow table can be reduced, and a load caused by analyzing the data flow can also be mitigated.

In one aspect, the system can be disposed in a network device. The network device includes a memory that stores a flow table, a flow filter and a flow analyzing module which is implemented by software or with hardware. The flow analyzing module is used to analyze and classify a plurality of packets of an input flow, and then identify an application category the input flow belongs to.

In the method, the processing circuit receives the input flow and resolves the input flow, and queries the flow table according to a result by resolving the input flow so as to determine whether or not the input flow matches any flow entry of the flow table. In addition, when the input flow does not match any flow entry of the flow table, the processing circuit queries the flow filter for determining whether or not the input flow matches any filtering condition of the flow filter.

According to another result of querying the flow table and the flow filter, one of the following steps can be performed. When the input flow matches any flow entry of the flow table, a corresponding processing policy is applied. Otherwise, when the input flow does not match any flow entry of the flow table, the flow filter is queried again for determining whether or not the input flow matches any filtering condition of the flow filter. When the input flow matches any filtering condition of the flow filter, the input flow is confirmed to be present in the flow table and includes the plurality of packets, and an action is to be performed according to a procedure setting by the network device. Further, when the input flow does not match any filtering condition of the flow filter, which means that the input flow does not match any flow entry of the flow table or any filtering condition of the flow filter, the input flow is then directed to the flow analyzing module for further processing.

Preferably, the system implements a data processing circuit of a network switch for processing the data flow in the network switch.

Moreover, the flow table is adapted to all types of the data flow. When the input flow matches any flow entry of the flow table, the system performs one of the following processing policies: setting the input flow as a high priority and forwarding the input flow to a destination port; dropping (discarding) the input flow; and copying the input flow to the flow analyzing module, and then forwarding the input flow to the destination port.

Further, the flow table records a 5-tuple of a header of the data flow, and the processing policies that correspond to the flow entries. The 5-tuple includes a destination IP address, a source IP address, a destination Layer 4 port, a source Layer 4 port and a communication protocol.

Preferably, the flow filter implements an incomplete comparison table used to query a connection-oriented flow by a Bloom filter. The Bloom filter performs k times of hash calculations on the input flow for obtaining a hash value so as to determine whether or not the input flow corresponds to k one-bit entries in the Bloom filter.

Furthermore, when the input flow is a first packet of the connection-oriented flow, and the first packet does not match any flow entry of the flow table by querying the flow table, the first packet is directed to the flow analyzing module. The flow analyzing module analyzes and classifies the first N packets, and then identifies the application category the first packet belongs to. After the application category of the first packet is identified, the first packet is forwarded to a destination address recorded in a header of the first packet according to a procedure setting in the network device. When it is determined that the input flow encounters aliasing in the flow filter, the flow analyzing module will insert the input flow into the flow table in advance and set up a corresponding processing policy according to the application category the input flow belongs to.

Still further, when it is determined that the input flow matches one filtering condition of the flow filter, the input flow is written into the flow filter, and the input flow that was inserted to the flow table in advance for avoiding the aliasing is removed.

In an aspect of the present disclosure, the system for processing the data flow with an incomplete comparison process can be disposed in a network device. The network device includes a memory that stores a flow table, a flow filter and a flow analyzing module which is implemented by software or with hardware. The flow analyzing module is used to analyze and classify packets of the input flow, and then identify the application category the input flow belongs to.

In the method, the processing circuit receives an input flow and resolves the input flow, and queries a flow table according to a result by resolving the input flow so as to determine whether or not the input flow matches any flow entry of the flow table. In addition, the processing circuit queries the flow filter for determining whether or not the input flow matches any filtering condition of the flow filter when the input flow does not match any flow entry of the flow table.

According to the result by querying the flow table and the flow filter, one of the following steps can be performed. When the input flow matches any flow entry of the flow table, a corresponding processing policy is applied. Otherwise, when the input flow does not match any flow entry of the flow table, the flow filter is queried again for determining whether or not the input flow matches any filtering condition of the flow filter. When the input flow matches any filtering condition of the flow filter, it is confirmed that the input flow exists in the flow table and includes multiple packets, and an action is performed according to a procedure setting by the network device. Further, when the input flow does not match any filtering condition of the flow filter, it indicates that the input flow does not match any flow entry and the flow table or any filtering condition of the flow filter. The input flow is directed to the flow analyzing module for further processing the input flow.

Preferably, the system for processing the data flow implements a data processing circuit of a network switch for processing the data flows in the network switch.

More, the flow table is adapted to all types of the data flows. When the input flow matches any flow entry of the flow table, the system performs one of processing policies including: setting the input flow as a high priority and forwarding the input flow to a destination port; dropping the input flow; and copying the input flow to the flow analyzing module, and then forwarding the input flow to the destination port.

Further, the flow table records a 5-tuple in a header of the data flow, and multiple processing policies corresponding to multiple flow entries. The 5-tuple includes a destination IP address, a source IP address, a destination Layer 4 port, a source Layer 4 port and a communication protocol.

Preferably, the flow filter implements an incomplete comparison table used to query a connection-oriented flow by a Bloom filter. The Bloom filter performs k times of hash calculations on the input flow for obtaining a hash value so as to determine whether or not the input flow corresponds to k one-bit entries in the Bloom filter.

Furthermore, when the input flow is a first packet of a connection-oriented flow, and the first packet does not match any flow entry of the flow table by querying the flow table, the first packet is directed to the flow analyzing module. The flow analyzing module analyzes and classifies the multiple first packets, and then identifies the application category the first packet belongs to. Afterwards, the first packet is forwarded to a destination address recorded in a header of the first packet according to a procedure setting in the network device. When it is determined that the input flow encounters aliasing in the flow filter, the flow analyzing module will insert the input flow into the flow table in advance and set up a processing policy according to the application category the input flow belongs to.

Still further, when it is determined that the input flow matches one filtering condition of the flow filter, the input flow is written into the flow filter, and the input flow that was inserted to the flow table in advance for avoiding the aliasing is removed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
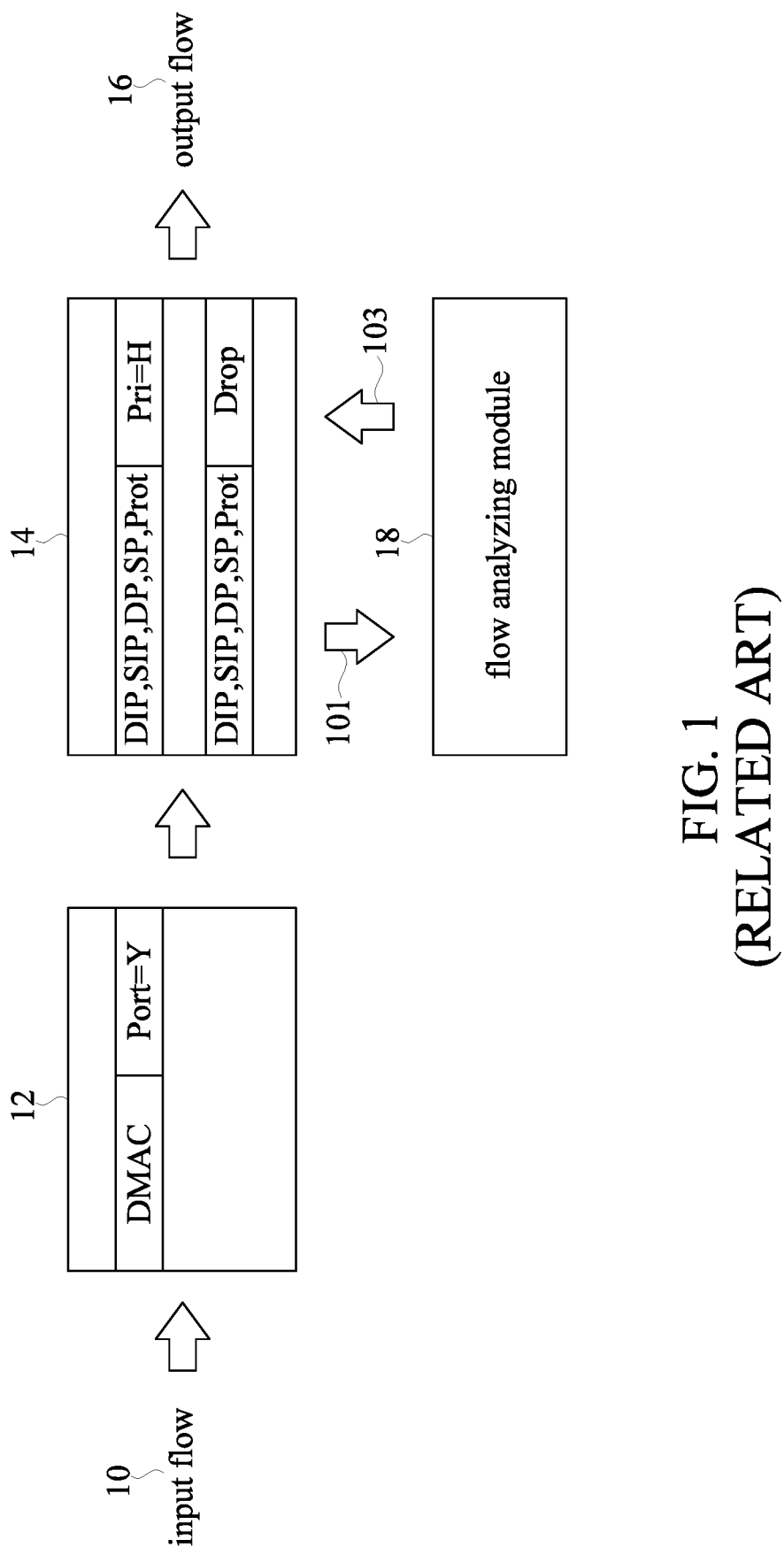
FIG. 1 is a schematic diagram showing a data flow being processed in a conventional network switch.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method and a system for processing a data flow with an incomplete comparison process. The method is based on an incomplete comparison table, and a flow filter (e.g., a Bloom filter) is used in the process. One of the advantages of the method is that, issues such as a large amount of memory space and an extra processing load being required to process the data flow can be prevented. According to one embodiment of the present disclosure, the Bloom filter is a probabilistic data structure that occupies a relatively small memory space and allows the system to quickly verify whether or not each of the data flows exists in the flow table.

In the method for processing the data flow, one of the technical concepts is to adopt both the incomplete comparison table and a conventional flow table that operates a complete comparison process. In the method, a data flow header (such as a 5-tuple 14 shown in FIG. 1) is queried, so as to reduce a size of the complete comparison table. An overall system cost can also be reduced.

The incomplete comparison table only stores a feature of the data flow when the data flow is required to be recorded in the incomplete comparison table. The feature can be data, digest or a hash value that is generated when the data flow is compressed. A space used for the incomplete comparison table is much smaller than the space required by the complete comparison table since the incomplete comparison table needs not to store the whole data flow. However, the incomplete comparison table may still need to solve an aliasing problem. For example, when the table is queried, the data flow that is not present in the table is falsely determined as being present in the table.

Therefore, in the present disclosure, the method for processing the data flow with the incomplete comparison process by use of the flow filter is provided. The flow filter embodies the incomplete comparison table. The flow filter can be a Bloom filter that is designed to have a compact k-times hash table structure. The theory of the flow filter is that k times of hash calculations map an element to k points in a bit array when the element is added to a set that implements a lookup table. These k points are set as 1. When the data flow is being filtered, whether the data flow is included in the set can be determined by only checking whether all the k points that map the k times of hash calculations are 1. If any of the k points is found to be 0, the data flow is determined not to be in the set. On the other hand, if all the k points are 1, the data flow is determined to be in the set.

In the method for processing the data flow with the incomplete comparison process by use of the Bloom filter, when the data flow is inserted to the Bloom filter, positions with respect to 1 bit width of flow entry mapping to k hash values of the data flow are initially set as 1. When querying the data flow in the Bloom filter for ensuring whether the data flow has been inserted to the Bloom filter, if k 1-bit entries mapping the k hash values of the data flow are 1, the k 1-bit entries meet the k hash values in the Bloom filter. The data flow that meets the Bloom filter is filtered out, and the data flow is determined to have been inserted to the Bloom filter; otherwise, no data flow is filtered out by the Bloom filter.

Figure 2:
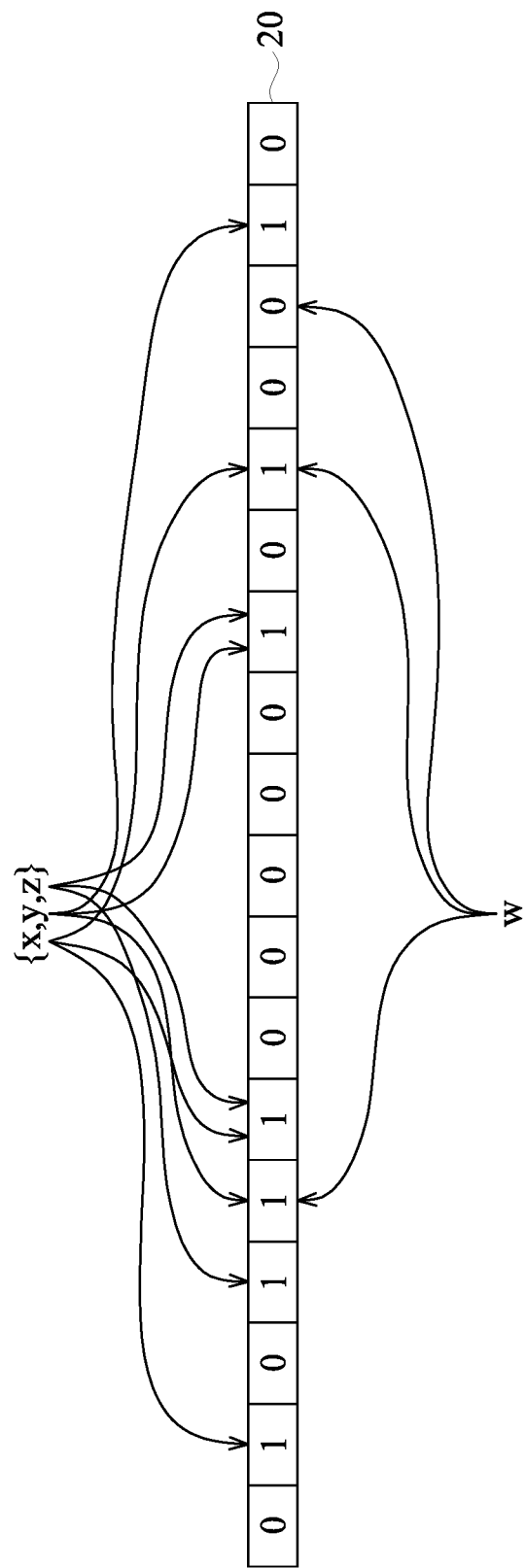
FIG. 2 is a schematic diagram depicting an exemplary example of a Bloom filter.

For example, referring to FIG. 2, an exemplary Bloom filter is shown. A bit array 20 is provided, and a data set {x, y, z} forms a filter. In an example where k=3, 3 times hash calculations are performed on each of the elements of the data set {x, y, z}, and used as a feature with respect to each of the elements. In the present example, the position being designated to each of the elements of the data set is set as 1. The element "x" of the data set has three connections respectively indicative of designating three bits with value "1" in the bit array 20. The element "y" of the data set also has three connections respectively indicative of designating another three bits with value "1" in the bit array 20. Further, the element "z" of the data set has three connections respectively indicative of designating yet another three bits with value "1" in the bit array 20. These connections between the elements of the data set {x, y, z} and the bit array 20 form a Bloom filter.

Using an input data "w" as an example, features with respect to the data "w" are calculated, and mapped to some bits of the bit array 20. The example shows that one of the bits mapped to the features of the data "w" is 0, which means that the data "w" is not within the data set {x, y, z} since not all values of the bits mapped to the features of the data "w" are 1. The present example exemplifies the Bloom filter used in the method for processing the data flow with the incomplete comparison process.

Figure 3:
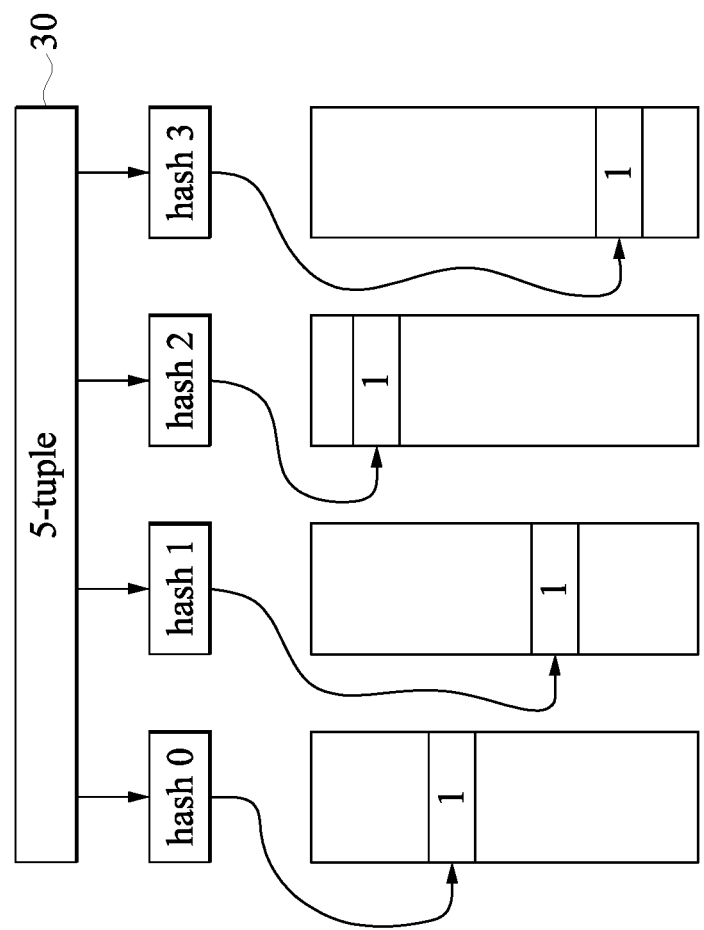
FIG. 3 is a schematic diagram depicting the Bloom filter that adopts parallel k hash tables.

Reference is made to FIG. 3, which is a schematic diagram depicting the Bloom filter that adopts parallel k hash tables according to one embodiment of the present disclosure. In the Bloom filter, k times of hash calculations are performed on a 5-tuple 30 of an input flow, and a hash table with a value k (k=4, i.e., hash 0, hash 1, hash 2 and hash 3) is obtained. The Bloom filter is able to filter out k features of the data flow. The k times of hash calculations performed on the input flow map to a flow entry with a 1-bit width which is set as 1. The k times of hash calculations act as features which are calculated from the 5-tuple of the input flow. To the various hash values, the Bloom filter with k parallel hash tables is used for determining whether or not the input flow exists in the incomplete comparison table.

Figure 4:
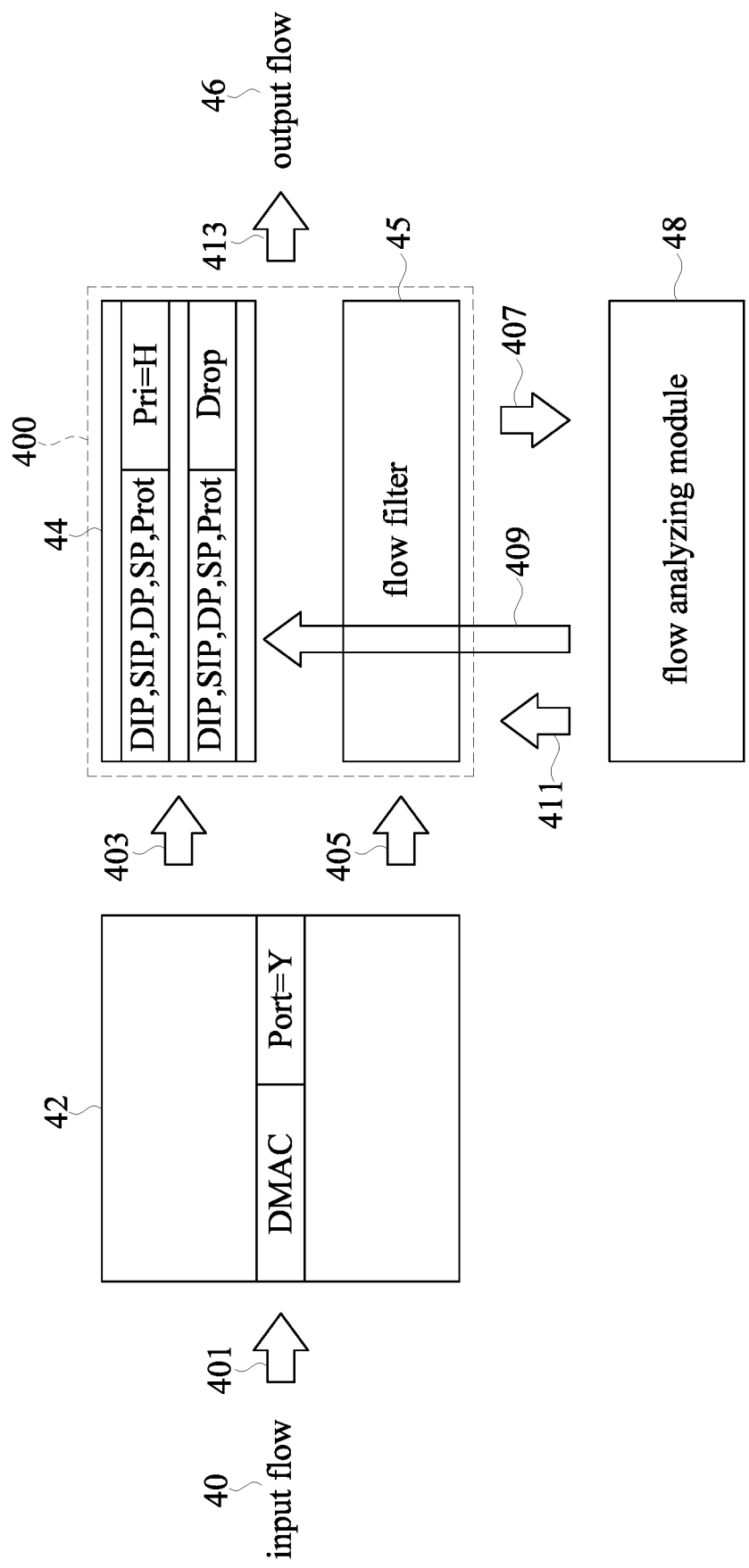
FIG. 4 is a schematic diagram depicting a framework of a system for processing the data flow with a flow filter according to one embodiment of the present disclosure.

Reference is made to FIG. 4, which is a schematic diagram depicting a framework of a system for processing the data flow with the flow filter. The system for processing the data flow embodies a data processing circuit of a network device, e.g., a data processing circuit of a network switch. The data processing circuit performs the method for processing the data flow with the incomplete comparison process in the network switch.

In the framework of the system for processing the data flow in the network switch, the system resolves an input flow 40 when the system receives the input flow 40. A header is resolved and then transmitted to a forwarding table 42. The forwarding table 42 is used to record a media access control (MAC) address in layer 2 (L2) or an IP address in layer 3 (L3) according to a network communication protocol with respect to the data flow. The forwarding table 42 records a destination MAC address (DMAC) and a destination port (Port=Y) of the input flow 40.

After resolving the input flow 40, the data of the data flow is also submitted to a flow table 44 implemented by a memory 400 of the system (i.e., the data processing circuit), and a flow filter 45. According to one embodiment of the present disclosure, the flow table 44 records 5-tuple data obtained from headers of multiple data flows. The 5-tuple data is, for example, a destination IP address (DIP), a source IP address (SIP), a destination Layer 4 port (DP), a source Layer 4 port (SP), a communication protocol (Prot (Protocol)) and processing policies that correspond to flow entries. When the input flow matches any flow entry of the flow table, one of the processing policies is performed. The processing policies include: setting priority of the input flow, dropping the data flow, copying the data flow to a flow analyzing module. Like the above-mentioned Bloom filter, the flow filter 45 is used to implement the incomplete comparison table.

The system for processing the data flow sets up the flow table 44 and the flow filter 45 in the memory 400, and the system also incorporates software or a circuitry to implement a flow analyzing module 48. If the input flow 40 does not match any flow entry of the flow table 44, the input flow 40 is determined as a new data flow, and the input flow 40 is copied to the flow analyzing module 48. In the flow analyzing module 48, packets of the input flow 40 are analyzed and classified, and then an application category that the input flow 40 belongs to is identified. Afterwards, the packets of the input flow 40 can be forwarded to a destination with the destination port (port=Y) recorded in the header of the packets according to a procedure setting by a switch or the network device.

Figure 5:
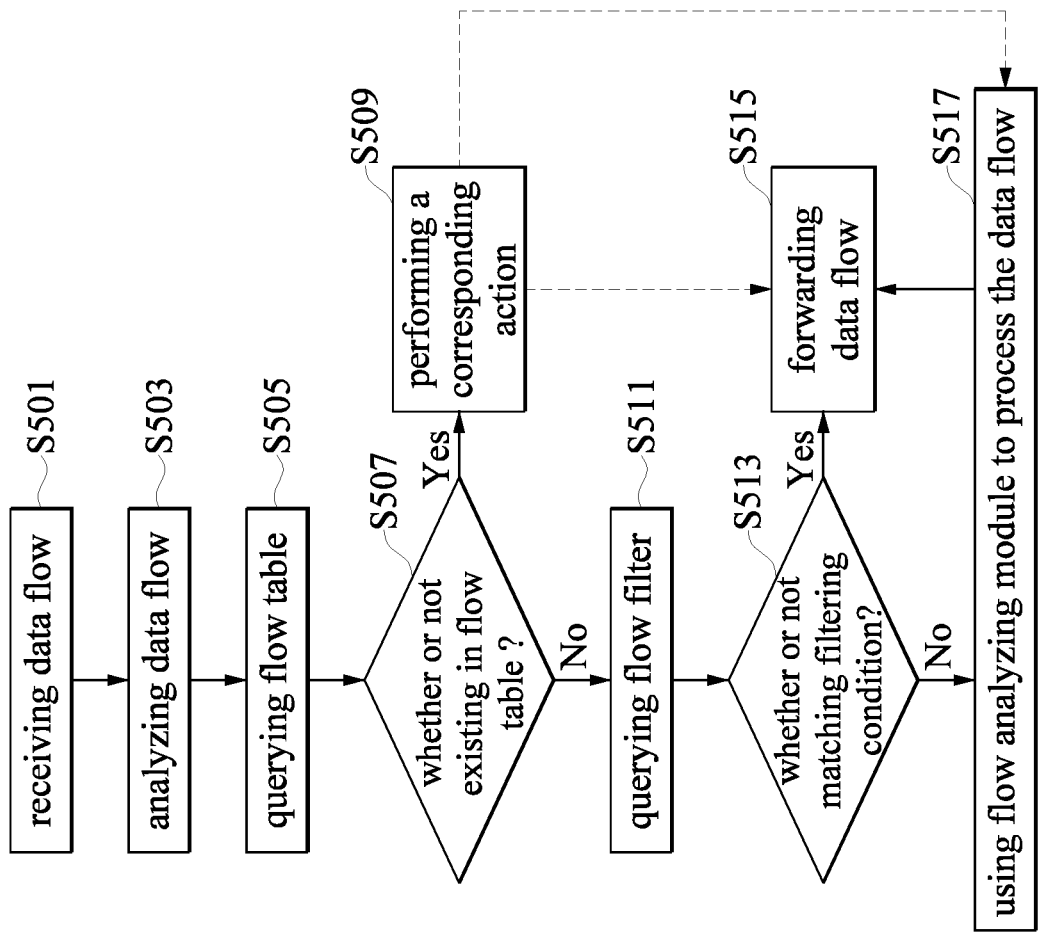
FIG. 5 is a flow chart describing a method for processing the data flow with an incomplete comparison process by use of the Bloom filter according to one embodiment of the present disclosure.

The system implements a processing circuit in the network switch. Regarding operations of the system, reference can be made to FIG. 5, which is a flow chart describing the method for processing the data flow with the incomplete comparison process using a Bloom filter according to one embodiment of the present disclosure.

Along a flow direction 401 shown in FIG. 4, the input flow 40 received by the system can be packets which are formed from a source with port "X" (port=X) (step S501). Headers of the packets can be extracted by resolving the input flow 40 (step S503). The forwarding table 42 records the destination port "Y" (port=Y). After that, the system queries the flow table 44 and the flow filter 45, and one of the following steps is performed according to a query result. It should be noted that the flow table 44 is adapted to all types of the data flow, and the flow filter 45 is used to check a connection-oriented flow.

Based on a result of resolving the input flow, the system queries the flow table 44 (along a flow direction 403, step S505). During a querying process, the system determines whether or not the features of the input flow 40 match any flow entry (step S507). If the features of the input flow 40 match any one of the flow entries in the flow table 44, a corresponding processing policy is applied to the input flow 40. For example, when the input flow matches any flow entry of the flow table, one of the following processing policies is performed: setting the input flow as a high priority (or a low priority) and forwarding the input flow to a destination port; dropping the input flow; and copying the input flow to the flow analyzing module, and forwarding the input flow to the destination port. In step S515, the data flow is forwarded to the destination port, e.g., port=Y (along a flow direction 413). Otherwise, the input flow 40 will be dropped according to another processing policy, or copied to the flow analyzing module 48 (step S517). Apart from the processes of analyzing, classifying and identifying the packets, the packets are also forwarded (step S515).

However, if the input flow 40 does not match any flow entry of the flow table 44, the flow filter 45 is queried according to the result by resolving the input flow 45 (along a flow direction 405, step S511) for determining whether or not the input flow 40 matches any filtering condition of the flow filter 45. Using the Bloom filter as an example, the Bloom filter performs k times of hash calculations on the 5-tuple of the input flow for obtaining k hash values that are used as the feature of the input flow. Accordingly, the feature is used to determine whether or not the input flow matches the k one-bit entries in the Bloom filter (step S513). If the query result indicates that the input flow 40 matches one of the filtering conditions, there is no need to perform any additional action, but only to perform an action originally set in the network device (i.e., the network switch) since the input flow 40 already exists and has transmitted multiple packets. For example, according to a procedure set in the network device, the input flow is forwarded to the destination port Y (port=Y) (step S515), so as to form an output flow 46. However, if the input flow 40 does not match any filtering condition of the flow filter 45 according to the query result, which means that the input flow 40 does not match any filtering condition set in the flow table and the flow filter, the input flow is then directed to the flow analyzing module for processing the data flow (along a flow direction 407, step S517). In the meantime, the input flow 40 can also be forwarded to a destination port, so that the output flow 46 is formed according to the original procedure set in the network device that applies the method for processing the data flow of the present disclosure.

Figure 6:
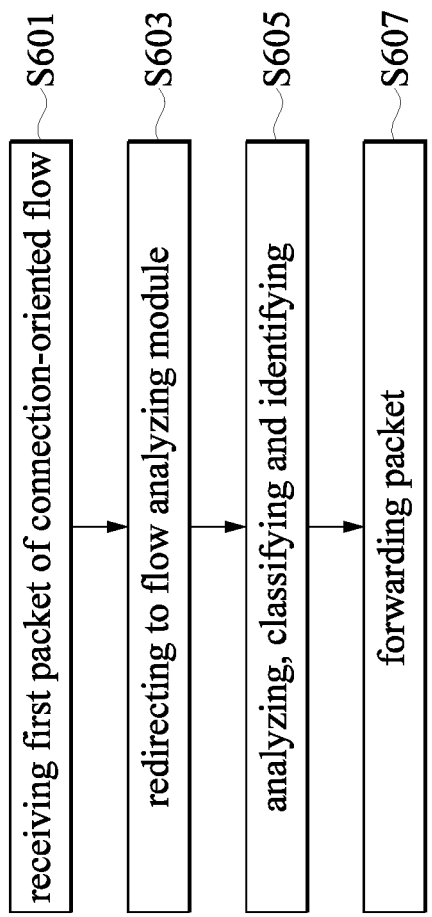
FIG. 6 is a flow chart describing a process for processing a first packet of the data flow according to one embodiment of the present disclosure.

FIG. 6 shows a flow chart describing a process for processing a first packet of the data flow according to one embodiment of the present disclosure. The process is operated in the flow filter. In particular, a communication session will be established before data transmission since the data flow to be processed in the process is a connection-oriented flow. For example, the connection-oriented flow can be a data flow under a transmission control protocol (TCP). In other words, the flow filter will not process a non-connection-oriented flow, such as the data flow under a user datagram protocol (UDP).

In the present embodiment of the present disclosure, the process starts when the network device receives the first packet of the connection-oriented flow (step S601). For a TCP data flow, an SYN flag recorded in a header of the first packet is set as 1 and an ACK flag in the header is set as 0. Accordingly, the network device can rely on the SYN/ACK flags to determine the first packet of the input flow. For the first packet, the input flow is a new data flow since the input flow does not match any flow entry of the flow table, and the input flow is directed to the flow analyzing module (along the flow direction 407, step S603).

In the meantime, the flow analyzing module analyzes and classifies the packets of the input flow, and then identifies the application category the input flow belongs to (step S605). Next, the flow analyzing module records and analyzes the input flow, and forwards the input flow to the destination port Y (along the flow direction 413, step S607) according to the destination information in the header and the procedure setting in the network device. It should be noted that the flow analyzing module acquires the packets of the input flow based on a query result by querying the flow table, and also receives the data flow that does not match any filtering condition of the flow filter. The flow analyzing module analyzes and classifies the input flow and identifies which application category the input flow belongs to.

Figure 7:
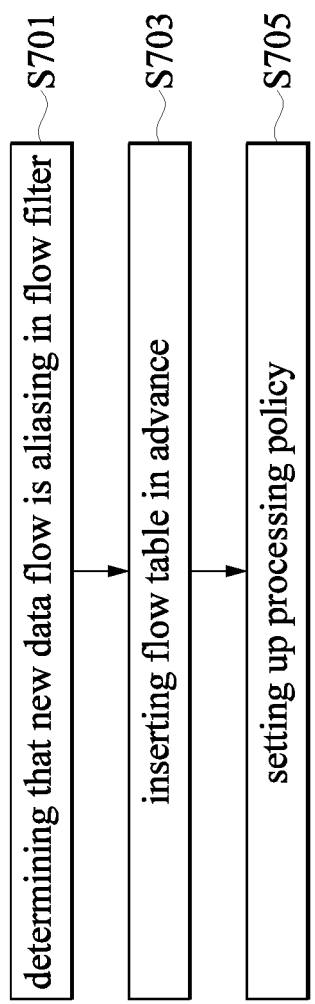
FIG. 7 is a flow chart describing a process for processing the data flow that experiences aliasing in the flow filter according to one embodiment of the present disclosure.

Referring to FIG. 7 (in continuation of FIG. 6), a flow chart describing a process for processing the data flow that encounters aliasing in the flow filter according to one embodiment of the present disclosure is shown.

When the first packet of the connection-oriented flow is directed to the flow analyzing module, the flow analyzing module determines whether or not the data flow will encounter aliasing in the flow filter, which is also to determine if any conflict occurs to any filtering condition in the flow filter. Using the TCP data flow as an example, the aliasing occurs if the values of k flow entries relating to the data flow are not 0 when receiving the first packet.

Thus, if the input flow is determined as a new data flow and the input flow is determined to encounter aliasing (step S701), the flow analyzing module inserts the input flow to the flow table in advance (along a flow direction 409, step S703) and sets up a corresponding processing policy (step S705). For example, in the flow table, a processing policy that copies the new data flow to the flow analyzing module is provided. Except for the first packet of the data flow, the other packets ($2^{nd}$ to N) of the data flow are copied to the flow analyzing module for analysis according to the processing policy in the flow table. The above process can prevent the data flow from being directly forwarded to an output port of the network device merely based on an incorrect determination that the data flow matches any filtering condition of the flow filter.

Figure 8:
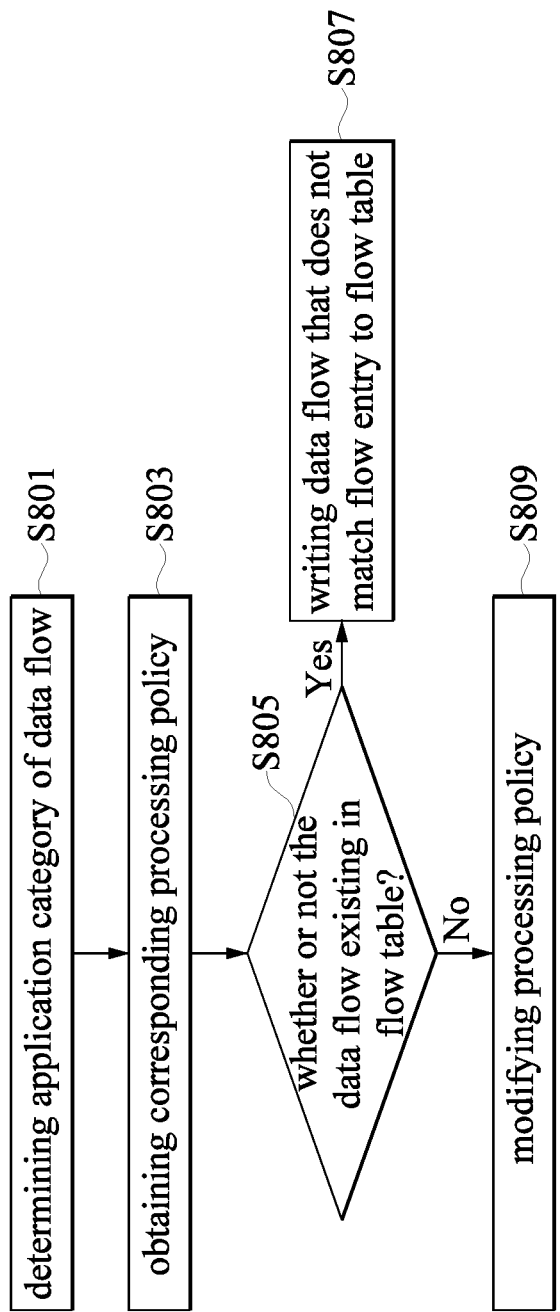
FIG. 8 is a flow chart describing operation of a flow analyzing module in the method for processing the data flow according to one embodiment of the present disclosure.

Reference is made to FIG. 8, which is a flow chart describing operation of the flow analyzing module in the method for processing the data flow according to one embodiment of the present disclosure. When the flow analyzing module analyzes the first N packets of the received input flow, the flow analyzing module determines the application category of the input flow (step S801) and determines a corresponding processing policy (step S803). For example, the processing policy is to set the input flow as a high priority or drop the packets of the input flow. Afterwards, whether or not the input flow has existed in the flow table (step S805) is to be determined. If the data flow does not exist in the flow table (since no flow entry is matched), the data flow can be inserted into the flow table (step S807). If the data flow has been inserted into the flow table in advance (e.g., step S701 of FIG. 7) due to the above-mentioned aliasing caused by the conflict in the flow filter, the flow analyzing module can change the original processing policy that is to copy the data flow to the flow analyzing module to an expected final strategy (step S809).

Figure 9:
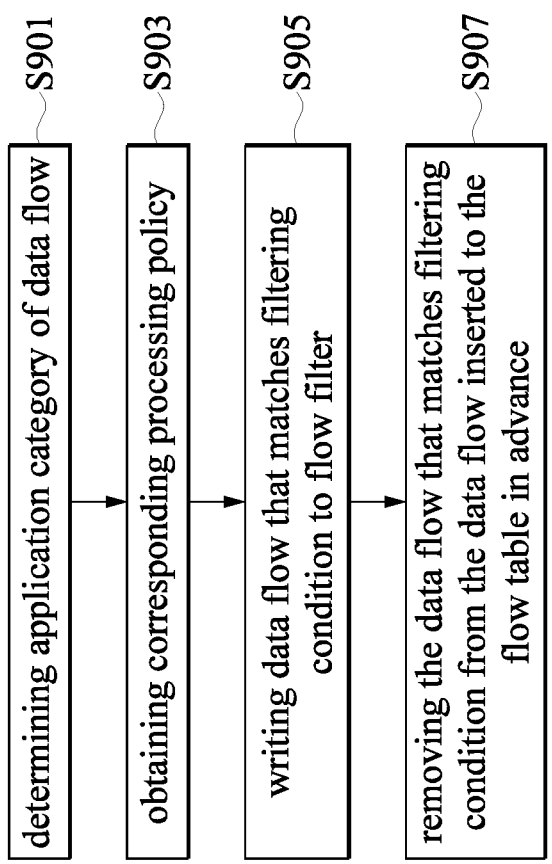
FIG. 9 is another flow chart describing the operation of the flow analyzing module in the method for processing the data flow according to one embodiment of the present disclosure.

Reference is made to FIG. 9, which shows another flow chart describing the operation of the flow analyzing module in the method for processing the data flow.

When the network device receives the input flow, the data flow is copied to the flow analyzing module. The flow analyzing module analyzes first N packets to determine the application category of the input flow (step S901), and a corresponding processing policy is obtained (step S903). After a comparison with the filtering conditions of the flow filter, the data flow matching any of the filtering conditions can be written to the flow filter (step S905), and become one of the flow entries in the flow filter.

In the meantime, referring to step S701 of FIG. 7, the input flow can be inserted to the flow table in advance for preventing the input flow from an aliasing condition due to the conflict in the flow filter, and the corresponding processing policy is to copy the data flow to the flow table. After step S905, if any data flow is found to match the filtering condition in the flow filter by analyzing N packets, the flow analyzing module removes the data flow that matches the filtering condition from the flow table. The data flow that is removed from the flow table is then written to the flow filter, such as in step S907. The data flow is written to the flow filter along a flow direction 411 illustrated in FIG. 4.

In summation, in the method and the system for processing the data flow with the incomplete comparison process provided by the present disclosure, both the flow filter (e.g., the Bloom filter) that implements the incomplete comparison process and the flow table that implements the complete comparison process are used. The data flow that matches any filtering condition of the flow filter is inserted to the flow filter. If the received data flow does not match any filtering condition of the flow filter, the data flow is copied to the flow analyzing module, thereby reducing the need for the conventional flow table. This incomplete comparison mechanism allows the flow table to only record the data flow requiring a special processing procedure (such as the data flow with high priority or a malicious data flow) and the non-connection-oriented flow. Since the flow table does not need to store all data flows, the memory that is originally required by the conventional complete comparison process can be reduced. Therefore, the overall system cost or any additional load can be effectively reduced.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing a data flow with an incomplete comparison process, which is adapted to a network device, the method comprising:
   receiving an input flow and resolving the input flow;
   querying a flow table according to a result of resolving the input flow, so as to determine whether or not the input flow matches any one of flow entries of the flow table;
   querying a flow filter, which implements an incomplete comparison table by a Bloom filter that is used for querying a connection-oriented flow, according to the result of resolving the input flow, so as to determine whether or not the input flow matches any filtering condition of the flow filter; wherein the Bloom filter performs k number of times of hash calculations on the input flow for obtaining a hash value, so as to determine whether or not the input flow corresponds to k one-bit entries in the Bloom filter;
   wherein, according to another result of querying the flow table and the flow filter, the method further comprises:
   applying a corresponding one of processing policies when the input flow matches any one of the flow entries of the flow table;
   re-querying the flow filter for determining whether or not the input flow matches any filtering condition of the flow filter when the input flow does not match any one of the flow entries of the flow table;
   confirming that the input flow is present in the flow table and includes a plurality of packets when the input flow matches any filtering condition of the flow filter, and performing an action according to a procedure set by the network device; and
   directing the input flow to a flow analyzing module for processing when the input flow does not match any filtering condition of the flow filter.

2. The method according to claim 1, wherein the flow table is adapted to all types of data flow, and when the input flow matches any one of the flow entries of the flow table, one of the processing policies provided below is performed:
   setting the input flow as a high priority and forwarding the input flow to a destination port;
   dropping the input flow; and
   copying the input flow to the flow analyzing module, and forwarding the input flow to the destination port.

3. The method according to claim 2, wherein the flow table records a 5-tuple of a header of the data flow, and the 5-tuple includes a destination IP address, a source IP address, a destination Layer 4 port, a source Layer 4 port, a communication protocol and the processing policies that correspond to the flow entries.

4. The method according to claim 1, wherein the Bloom filter performs k number of times of the hash calculations on the 5-tuple of the input flow for obtaining k number of hash values.

5. The method according to claim 1, wherein the flow analyzing module is used to analyze and classify the packets of the input flow, and to identify an application category that the input flow belongs to.

6. The method according to claim 5, wherein, when the input flow is a first packet of the connection-oriented flow, and the first packet does not match any one of the flow entries of the flow table by querying the flow table, the first packet is directed to the flow analyzing module for analysis and classification, and for identification of the application category that the first packet belongs to, and then the first packet is forwarded to a destination address recorded in a header of the first packet according to the procedure set by the network device.

7. The method according to claim 5, wherein, when the input flow is determined to experience aliasing in the flow filter, the flow analyzing module inserts the input flow to the flow table in advance, and sets up a corresponding one of the processing policies according to the application category that the input flow belongs to.

8. The method according to claim 7, wherein, when the input flow is determined to match one filtering condition of the flow filter, the input flow is written into the flow filter, and the input flow inserted to the flow table in advance for avoiding the aliasing is removed.

9. A system for processing a data flow, which is used in a network device, the system comprising:
   a memory storing a flow table and a flow filter; and
   a flow analyzing module used to analyze and classify a plurality of packets of an input flow, and to identify an application category that the input flow belongs to;

wherein the system performs a method for processing the data flow with an incomplete comparison process, the method including:

receiving the input flow and resolving the input flow;

querying the flow table, which implements an incomplete comparison table by a Bloom filter that is used for querying a connection-oriented flow, according to a result of resolving the input flow, so as to determine whether or not the input flow matches any one of flow entries of the flow table; wherein the Bloom filter performs k number of times of hash calculations on the input flow for obtaining a hash value, so as to determine whether or not the input flow corresponds to k one-bit entries in the Bloom filter;

querying the flow filter according to the result of resolving the input flow, so as to determine whether or not the input flow matches any filtering condition of the flow filter;

wherein, according to another result of querying the flow table and the flow filter, the method further includes:

applying a corresponding one of processing policies when the input flow matches any one of the flow entries of the flow table;

re-querying the flow filter for determining whether or not the input flow matches any filtering condition of the flow filter when the input flow does not match any one of the flow entries of the flow table;

confirming that the input flow is present in the flow table and includes the plurality of packets when the input flow matches any filtering condition of the flow filter, and performing an action according to a procedure set by the network device; and directing the input flow to the flow analyzing module for processing when the input flow does not match any filtering condition of the flow filter.

10. The system according to claim 9, wherein the system implements a data processing circuit of a network switch for processing the data flow in the network switch.

11. The system according to claim 9, wherein the flow table is adapted to all types of data flow, and when the input flow matches any one of the flow entries of the flow table, one of the processing policies provided below is performed:

setting the input flow as a high priority and forwarding the input flow to a destination port;

dropping the input flow; and copying the input flow to the flow analyzing module, and forwarding the input flow to the destination port.

12. The system according to claim 11, wherein the flow table records a 5-tuple of a header of the data flow, and the 5-tuple includes a destination IP address, a source IP address, a destination Layer 4 port, a source Layer 4 port, a communication protocol and the processing policies that correspond to the flow entries.

13. The system according to claim 9, wherein the Bloom filter performs the k number of times of the hash calculations on the 5-tuple of the input flow for obtaining k number of hash values.

14. The system according to claim 9, wherein, when the input flow is a first packet of the connection-oriented flow, and the first packet does not match any one of the flow entries of the flow table by querying the flow table, the first packet is directed to the flow analyzing module for analysis and classification, and for identification of the application category that the first packet belongs to, and then the first packet is forwarded to a destination address recorded in a header of the first packet according to the procedure set by the network device.

15. The system according to claim 9, wherein, when the input flow is determined to experience aliasing in the flow filter, the flow analyzing module inserts the input flow to the flow table in advance, and sets up a corresponding one of the processing policies according to the application category that the input flow belongs to.

16. The system according to claim 15, when the input flow is determined to match one filtering condition of the flow filter, the input flow is written into the flow filter, and the input flow inserted to the flow table in advance for avoiding the aliasing is removed.

* * * * *